June 25, 1935.  H. B. TRIX  2,006,153
THERMOSTATIC VALVE
Filed Sept. 30, 1933  2 Sheets-Sheet 1
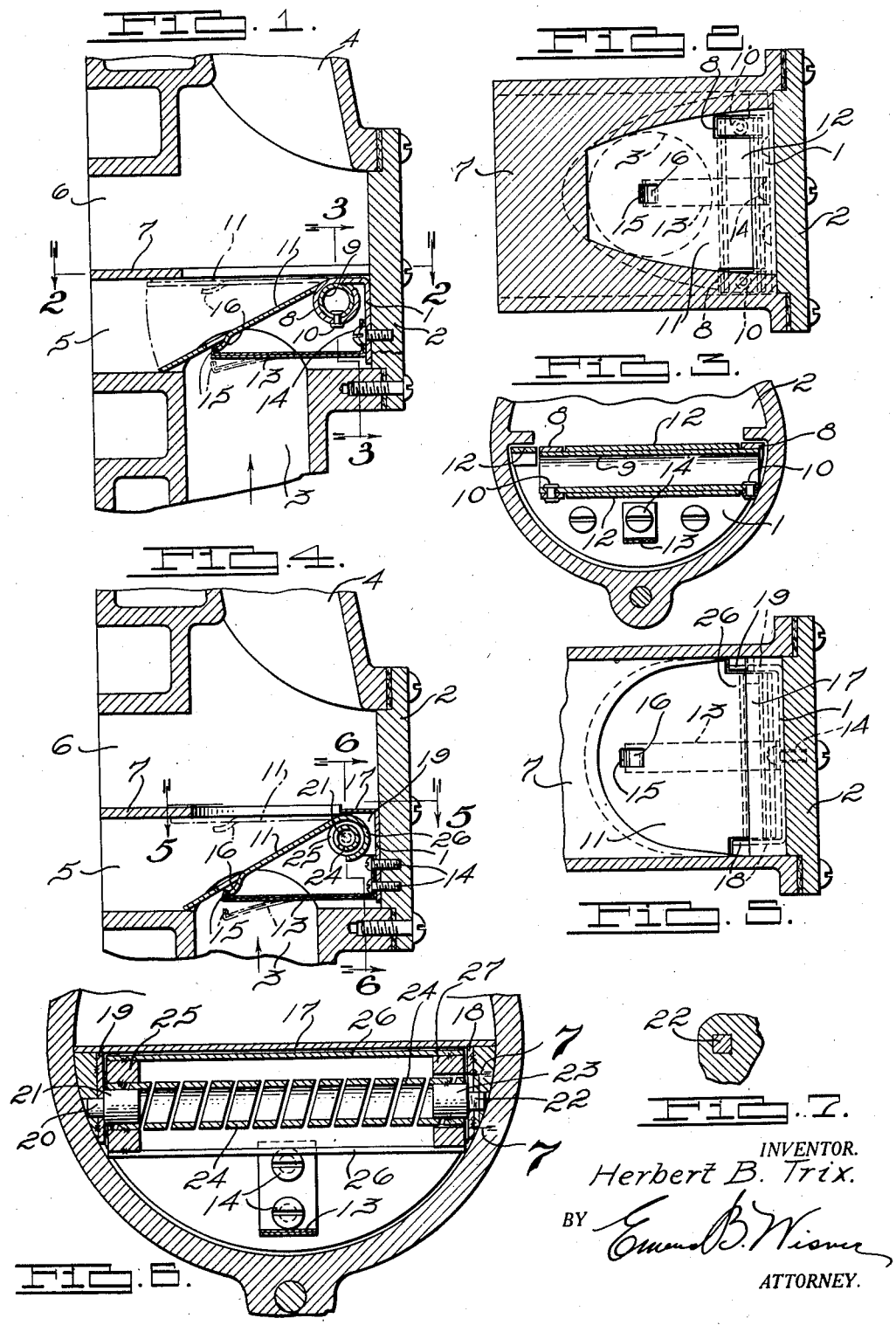
INVENTOR.
Herbert B. Trix.
BY
ATTORNEY.

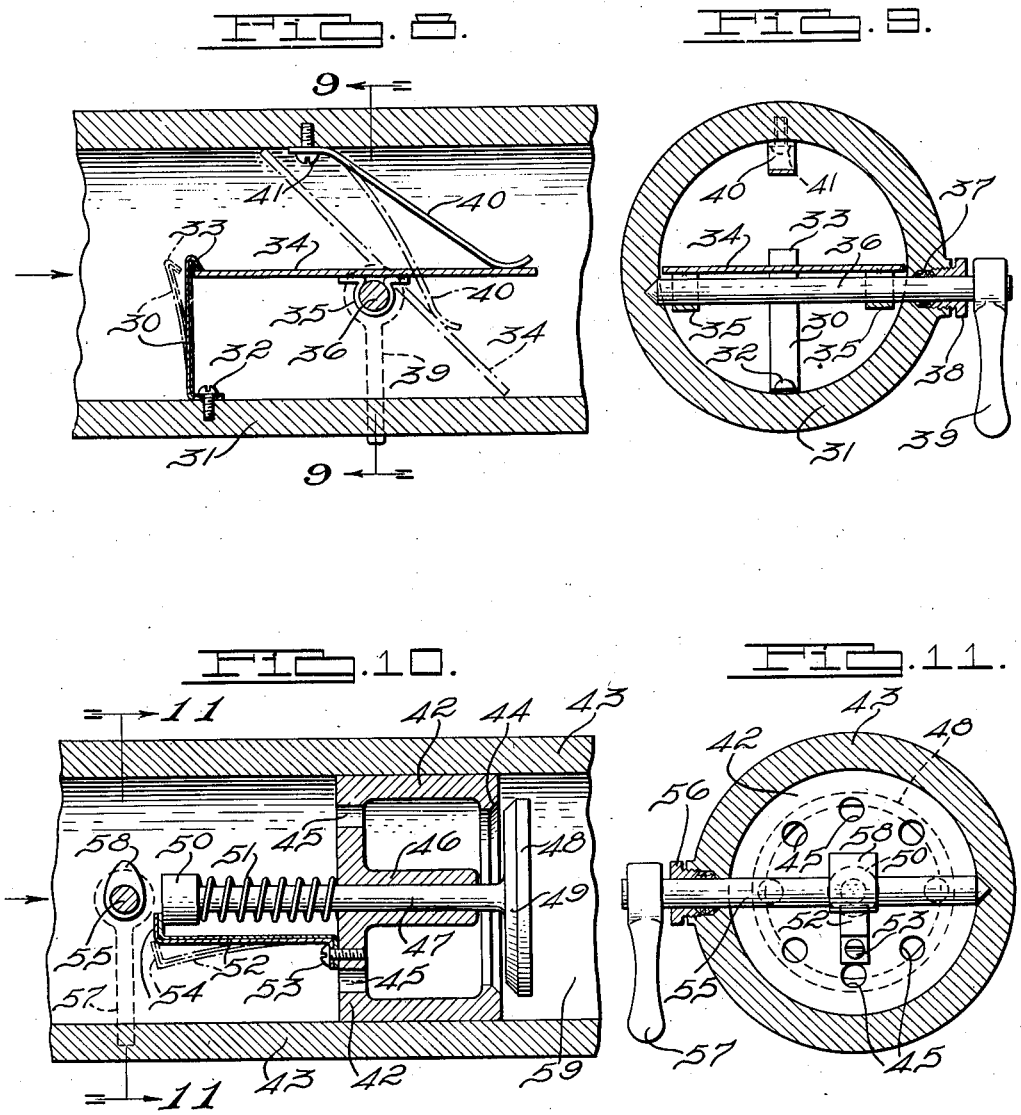

Patented June 25, 1935

2,006,153

UNITED STATES PATENT OFFICE 2,006,153

THERMOSTATIC VALVE

Herbert B. Trix, Grosse Pointe Village, Mich., assignor to American Injector Company, Detroit, Mich., a corporation of Michigan Application September 30, 1933, Serial No. 691,719

6 Claims. (Cl. 236—34)

This invention relates to thermostatic valves and the object of the invention is to provide a thermostatic valve in which the valve member is locked in position by means of a bimetallic arm, the said arm being arranged to release the valve member upon change in temperature.

Another object of the invention is to provide a thermostatic valve in which the valve member is released upon increase in temperature and upon a subsequent decrease in temperature the valve member is again locked in position.

A further object of the invention is to provide a device of the character described including a bimetallic arm for locking or releasing the valve, in which the valve is provided at the pivot with a helical thermostatic element arranged to vary the opening of the valve in accordance with the temperature of the fluid flowing past the valve.

Another object of the invention is to provide a valve which is normally locked in the closed position and upon increase of temperature is unlocked by a thermostatic arm and is then subject to a second thermostatic element controlling the position of the valve in relation to the temperature of the fluid flowing past the valve.

A further object of the invention is to provide a valve of the character described in which the valve under decrease of temperature returns to the closed position and the bimetallic arm will then move to position to lock the valve as the temperature of the fluid further decreases.

These objects and the several novel features of the invention are hereinafter more fully described and claimed and the preferred form of construction by which these objects are attained is shown in the accompanying drawings in which—

Fig. 1 is a section through a thermostatic valve embodying my invention.

Fig. 2 is a section taken on line 2—2 of Fig. 1.

Fig. 3 is a section taken on line 3—3 of Fig. 1.

Fig. 4 is a section similar to Fig. 1 showing an alternative type of valve provided with a helical thermostat about its pivot.

Fig. 5 is a section taken on line 5—5 of Fig. 4.

Fig. 6 is an enlarged section taken on line 6—6 of Fig. 4.

Fig. 7 is a fragmentary section taken on line 7—7 of Fig. 6.

Fig. 8 is a section through an alternative form of the valve held in the open position by a bimetallic arm.

Fig. 9 is a section taken on line 9—9 of Fig. 8.

Fig. 10 is a section through a poppet type valve normally held in the open position by a bimetallic arm.

Fig. 11 is a section taken on line 11—11 of Fig. 10.

The valve shown in Fig. 1 comprises a bracket 1 and in this figure the valve is shown as used to control the water circulating system of an internal combustion engine. However, this valve may be used in any form of conduit with any type of fluid flowing therethrough in which the temperature of the fluid varies. In this connection the valve will work as efficiently with a gas as with a liquid.

In the form shown in Fig. 1 the bracket 1 is secured to an adjacent portion of the engine water jacket 2 and this water jacket is provided with an inlet 3 and an outlet 4. In the particular type of the device shown, a conduit 5 is provided leading into the water jacket of the engine and a return conduit 6 is provided leading from the water jacket of the engine to the outlet 4, while a partition 7 is provided between the conduits 5 and 6.

As shown in Fig. 2 the bracket 1 is provided with extending circular ends 8 in which a tube 9 is secured by the rivets 10 and the valve member 11 is provided with an end 12 extending about the tube 9 and pivotally mounted thereon. The bimetallic arm 13 is provided with an upturned end which is secured to the bracket 2 by the screw 14 and at the opposite end this bimetallic element is provided with an upturned end 15. A lug 16 is struck downwardly from the plane of the valve member 11 and the end 15 of the bimetallic element normally engages over the edge of the lug 16, as will be understood from Figs. 1 and 2.

In the position shown in Fig. 1 the valve member 11 is locked in the closed position by the bimetallic arm engaging over the lug 16. As this is used in connection with an automobile engine, the water jackets are normally full of water for cooling the engine and the object of the valve is to prevent circulation of the water until it reaches a predetermined temperature. As the water in the inlet 3 reaches approximately 120 degrees in temperature after the engine has been started, the bimetallic arm will move to the dotted position shown in Fig. 1 thus unlocking the valve and allowing the pressure of the water in the inlet 3 to raise the valve to the dotted position shown in Fig. 1 so that the water may flow through the conduit 5, through the water jackets of the engine and thence back through the conduit 6 and out through the outlet 4. With this type of engine, a water pump or impeller is generally used to assure circulation of the water and as soon as the valve is opened the water will, of course, circulate in the normal manner.

If the engine is idling, the valve may not be pushed up to the extreme position shown in dotted lines in Fig. 1 but may assume an intermediate position depending upon the flow of water past the valve. When the engine is stopped, the valve will fall by gravity to the position shown in full lines in Fig. 1 but the bimetallic arm 13 will not return to the locked position until the temperature of the water thereabout drops to 120 degrees or below, at which time, it will move to position to lock the valve in the closed position. This device is very useful on automobiles with which hot water heaters are utilized as it insures bringing the water up to temperature before circulation of the water commences and thus the water may be heated to get the maximum efficiency from the engine and from the water heater in the shortest possible time. While the bimetallic arm 13 may be arranged to open at 120 degrees temperature, it may be arranged to open at a higher or lower degree of temperature, if desired, in which case the bimetallic arm 13 would be constructed to release the valve at the desired temperature.

An alternative form of the construction is shown in Figs. 4, 5, 6 and 7. In this form of construction, a helical thermostat is provided for controlling the position of the valve in relation to the temperature of the fluid flowing thereby.
In this form the bracket 1 is provided with a flange 17 at the top shown in Figs. 4, 5 and 6 and is also provided with outwardly bent flanges 18 and 19 at the ends which extend beneath the flange 17. The flange 19 is provided with a round aperture in which the round end 20 of a member 21 is positioned and the flange 18 is provided with a square aperture in which the square end 22 of a member 23 is positioned.

A helical thermostat 24 is welded to or otherwise secured to the member 23 at one end while at the opposite end the helical thermostat fits about the member 21. A ring 25 is welded or otherwise secured to the exterior of the helical thermostat about the member 21 and the valve member 11 is provided with an end 26 extending about the ring 25 and welded or otherwise secured thereto. This end 26 is also secured to a ring 27 at the end opposite the ring 25 and this ring 27 is spaced from the helical thermostat, as shown in Fig. 6. The bimetallic arm 13 is secured to the bracket 1 in the same manner as shown in Fig. 1 by means of screws 14 and this bimetallic arm is provided with an upturned end 15 for engaging the lug 16 of the valve 11. The locking action of the bimetallic arm 13 is the same as that described in Fig. 1 and as the valve 11 is released by downward movement of the bimetallic arm the fluid comes in contact with the helical thermostat 24 thus opening the valve in accordance with the temperature of the fluid. One end of the helical thermostat is held in fixed position by the square end 22 of the member 23 and thus the temperature of the fluid will cause the helical thermostat to turn thus turning the opposite end of the helical thermostat and by means of the ring 25 which is secured to the helical thermostat and to the end 26 of the valve the turning movement of the thermostat will turn the valve in accordance with the temperature of the fluid to open the conduit 5 proportionately. With this construction the flow of fluid past the valve will be controlled accurately by the helical thermostat in that the helical thermostat will control the opening of the valve and restrict or allow flow of the fluid in accordance with the temperature of the fluid.

In some cases it may be very desirable to lock the valve in the open position by means of a bimetallic arm 30 shown in Figs. 8 and 9. In this form of the device the bimetallic arm is secured in the interior of a conduit 31 by means of the screw 32 and the bimetallic arm is provided with an upturned end 33 to engage over the valve 34. This valve 34 is provided with a pair of brackets 35 secured thereto, as shown in Figs. 7 and 8, and a shaft 36 is pressed through these brackets so that the shaft is a press fit in the brackets and the valve 34 will turn with the shaft 36. A packing 37 is provided with which a packing nut 38 is used and a handle 39 is secured to the end of the shaft for re-setting the valve. A flat spring 40 is secured to the interior of the conduit by the screw 41 and presses downwardly on the end of the valve 34 opposite the bimetallic arm.

In operation the flow through the conduit is in the direction of the arrow shown in Fig. 8. Under normal conditions, the valve is held open by the bimetallic arm as shown. However, should the temperature of the fluid flowing through the conduit raise, the bimetallic arm will move to the position shown in dotted lines in Fig. 8, at which time, the spring 40 will press the valve down to the closed position shown in dotted lines in Fig. 8. This movement of the valve also turns the shaft 36 and handle 39 and by means of the handle, the valve may be turned back to engage beneath the end 33 of the bimetallic arm 30 so that the valve can be re-set with the handle as soon as the temperature is back to normal. This arrangement is very useful in a number of different installations, an instance of which would be for use in connection with a shower head in which a sudden flow of scalding water might occur and burn the bather.

With this device in the conduit leading to the shower head a sudden flow of hot water would instantly close off the conduit.

In Figs. 10 and 11 an arrangement is shown for holding a poppet valve in the open position by means of a bimetallic arm. In this form a valve seat member 42 is fitted into a conduit 43 and is provided with a valve seat 44. At the end opposite the seat 44 a series of apertures 45 are provided and a guide 46 is provided for the valve stem 47. A poppet valve head 48 is secured to the stem and is provided with a face 49 to fit the valve seat 44. At the end of the stem opposite the head, an enlargement 50 is provided and a coiled spring 51 is positioned about the valve stem between the end 50 and the member 42. This spring 51 normally moves the poppet valve to the closed position unless prevented by the bimetallic arm 52 which is secured to the valve seat member 42 by the screw 53. This bimetallic arm is provided with an upturned end 54 arranged to normally engage behind the enlarged end 50 on the valve stem and hold the poppet valve in the open position. A shaft 55 is mounted in the conduit and is provided with a packing nut 56 and with a handle 57 for re-setting the valve. This shaft 55 is provided with a cam 58 thereon as shown.

The flow through this device is in the direction of the arrow shown in Fig. 10 and the fluid will flow through the apertures 45 and between the valve head and seat and on through the conduit.

This valve is particularly useful in connection with a gas in which a back fire in the portion 59 of the conduit will pass between the valve and seat and through the openings 45 to heat the bimetallic arm 52 which will immediately move to the dotted position.

This will release the valve to action by the spring 51 which will move the valve 48 to engagement with the seat 44 thus closing the conduit against further back pressure. In this movement of the valve, the end 50 will stop adjacent the cam 58. As the gas cools off about the bimetallic arm 52 the end of this arm will move up into engagement with the cylindrical face of the end 50, at which time, the handle 57 may be turned to turn the cam 58 against the end 50 and move it forward to a position where the bimetallic arm may again engage behind the end 50 to hold the valve in the open position. The handle 57 may then be again turned to the dotted position shown in Fig. 10 whereupon the device is entirely re-set for further operation.

From the foregoing description it becomes evident that the device is very simple and efficient in operation, is composed of few parts and is of consequent low manufacturing cost, will not easily get out of order and provides a device which accomplishes the objects described.

Having thus fully described my invention, its utility and mode of operation, what I claim and desire to secure by Letters Patent of the United States is—

1. In a thermostatic valve, a bracket, a valve member pivotally mounted on the bracket and provided with a depending lug, the valve member being arranged to fall by gravity to the closed position, a bimetallic arm having an end normally engaging the lug of the valve member to hold the valve member in the closed position, the bimetallic arm being arranged to release the valve member upon reaching a pre-determined temperature and a helical thermostat arranged to turn the valve member on its pivot under temperature variation.

2. In a thermostatic valve, a pivotally mounted valve member, a bimetallic arm normally engaging the valve member to hold it in fixed position, the bimetallic arm being arranged to release the valve member upon reaching a pre-determined temperature and a thermostat arranged to turn the valve member on its pivot under temperature change.

3. In a thermostatic valve, a pivotally mounted valve member, a thermostatic arm normally engaging the valve member to hold it in fixed position, the thermostatic arm being arranged to move out of engagement with the valve member upon reaching a pre-determined temperature and a thermostat arranged to turn the valve member on its pivot under temperature variation.

4. In a thermostatic valve, a pivotally mounted valve member, a thermostat arranged to turn the valve member on its pivot under temperature variation and a bimetallic arm normally holding the valve member in a pre-determined position, the bimetallic arm being arranged to release the valve member to action by the thermostat upon reaching a pre-determined temperature.

5. In a thermostatic valve, a pivotally mounted valve member, a thermostat arranged to turn the valve member on its pivot upon temperature variation and a thermostatic arm normally holding the valve member in a pre-determined position, the thermostatic arm being arranged to release the valve member to movement by the thermostat upon reaching a pre-determined temperature.

6. In a thermostatic valve, a valve member, a thermostat arranged to turn the valve member under temperature variation and a bimetallic arm normally holding the valve member in a pre-determined position, the bimetallic arm being arranged to release the valve member to action by the thermostat upon reaching a pre-determined temperature.

HERBERT B. TRIX.